US011566948B2

(12) United States Patent
Alvarez et al.

(10) Patent No.: US 11,566,948 B2
(45) Date of Patent: Jan. 31, 2023

(54) ENHANCING RTD MEASUREMENT ACCURACY BY MEANS OF VARIABLE EXCITATION CURRENT

(71) Applicant: Honeywell International Inc., Morris Plains, NM (US)

(72) Inventors: Eduardo Gallestey Alvarez, Baden (CH); Sarabjit Singh, Hyderabad (IN); Shripad Kumar Pande, Tellapur (IN); Seshagiri Yamarthi, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 430 days.

(21) Appl. No.: 16/789,425

(22) Filed: Feb. 13, 2020

(65) Prior Publication Data

US 2021/0255046 A1    Aug. 19, 2021

(51) Int. Cl.
*G01K 7/18* (2006.01)
*G01K 15/00* (2006.01)
G01K 7/22 (2006.01)

(52) U.S. Cl.
CPC ............. *G01K 7/18* (2013.01); *G01K 7/22* (2013.01); *G01K 15/005* (2013.01)

(58) Field of Classification Search
CPC ........... G01K 7/18; G01K 7/22; G01K 15/005
See application file for complete search history.

(56) References Cited

U.S. PATENT DOCUMENTS

| 8,497,759 B2* | 7/2013 | Kurtz | G01K 7/183 338/28 |
| 10,180,450 B1* | 1/2019 | Beeram | G01K 7/16 |
| 10,317,292 B2* | 6/2019 | Liaghati | G01K 7/20 |
| 2003/0040670 A1* | 2/2003 | Govari | A61B 5/062 324/207.13 |

(Continued)

FOREIGN PATENT DOCUMENTS

| GB | 255527 A | 5/2018 |
| GB | 2555527 A | 5/2018 |

OTHER PUBLICATIONS

Bruce Temp, "Analog linearization of resistance temperature detectors", Analog Applications Journal, High-Performance Analog Products, 4Q, 2011 www.ti.com/aaj (2011).

(Continued)

*Primary Examiner* — Nathaniel T Woodward
*Assistant Examiner* — Philip L Cotey
(74) *Attorney, Agent, or Firm* — Ortiz & Lopez, PLLC; Kermit D. Lopez; Luis M. Ortiz

(57) ABSTRACT

A method, apparatus and system for measuring a temperature can involve measuring a voltage with a resistance temperature detector using a variable excitation current, and deriving a process temperature from the voltage measured by the resistance temperature detector. The process temperature can be further derived by applying a plurality of values of the variable excitation current, measuring corresponding values of voltage, and estimating a resistance by applying a least square estimation. The process temperature can also be (Continued)

derived by applying a different value of the variable excitation current at every iteration, using a recursive least square estimation to measure a resistance, and using confidence intervals for instrument diagnostics.

14 Claims, 9 Drawing Sheets

(56) References Cited

U.S. PATENT DOCUMENTS

| | | | | |
|---|---|---|---|---|
| 2003/0132734 A1* | 7/2003 | Gibbs | ............ | G01K 7/16 374/E7.018 |
| 2008/0224817 A1* | 9/2008 | Vellore | ............ | H01L 21/67248 338/25 |
| 2010/0177800 A1* | 7/2010 | Rud | ............ | G01K 7/20 374/E7.018 |
| 2010/0198546 A1* | 8/2010 | Kamata | ............ | H03B 5/04 374/143 |
| 2013/0085725 A1* | 4/2013 | Singh | ............ | G01K 7/16 703/2 |
| 2014/0056329 A1* | 2/2014 | Alley | ............ | G01K 15/007 374/185 |
| 2014/0088905 A1* | 3/2014 | Rud | ............ | G01K 7/021 702/133 |
| 2015/0147608 A1* | 5/2015 | Lin | ............ | G01R 31/3648 429/62 |
| 2017/0322089 A1* | 11/2017 | Kumar Beeram | ............ | G01K 7/20 |
| 2018/0266908 A1* | 9/2018 | Yamamoto | ............ | G01L 9/00 |
| 2018/0372788 A1* | 12/2018 | Beeram | ............ | G01K 7/20 |
| 2019/0219452 A1* | 7/2019 | Hayes | ............ | G01K 7/16 |
| 2020/0103289 A1* | 4/2020 | Horng | ............ | G01K 15/005 |

OTHER PUBLICATIONS

Search Report for corresponding EP Application No. 21156994.2.
Abinayaa et.al., Survey on Sensors in an Industrial Application.
Examination Report for corresponding Indian Application No. 202114006166.

* cited by examiner

ENHANCING RTD MEASUREMENT ACCURACY BY MEANS OF VARIABLE EXCITATION CURRENT

TECHNICAL FIELD

Embodiments are generally related to industrial process control and monitoring systems. More specifically, embodiments relate to the measurement of the temperature of a process fluid in industrial process control and monitoring systems. Embodiments also relate to sensor devices, including hardware devices with at least some embedded software that facilitate measuring, detecting and transmitting data (e.g., temperature, pressure, motion, etc). Embodiments further relate to RTD (Resistance Temperature Detector) sensors, and methods of operating such sensors.

BACKGROUND

Industrial process control and monitoring systems can be used to monitor and/or control industrial processes. For example, a process variable such as pressure, temperature, flow, etc. of a process fluid can be measured by a process variable transmitter. This information can allow an operator to monitor the operation of the process. Furthermore, the measured process variable can be used as an input to a control algorithm and used to control operation of the process.

In many instances, a process variable transmitter may be located at a remote location and can transmit data (e.g., temperature, pressure, motion, etc) back to a central location over a process control loop. The process control loop can include, for example, a two wire process control loop in which the process variable can be transmitted in an analog manner, for example, based upon a 4-20 mA current level flowing through the loop, or a digital manner to the central location. The same two wires can be used to provide power to the process variable transmitter. Another example of a process control loop is a wireless control loop in which data can be transmitted wirelessly.

One type of process variable, which may be measured, is temperature. Various types of temperature sensors can be used to measure temperature and other conditions (e.g., pressure, motion, etc). One type of temperature sensor is a resistance based temperature sensor known as an RTD. The resistance of the RTD varies as a function of temperature.

RTD sensors are thus temperature-sensing devices in which the resistance of an RTD sensor increases with temperature. RTD measurements can be based on ratiometric voltage measurement, where a known current is passed through the RTD (also referred to as an "RTD sensor"). FIG. 1 illustrates a schematic diagram of a prior art RTD circuit 10 that includes an RTD sensor 14 with respect to a current source 12. The process temperature can be derived from the measured RTD voltage (V) according to the following equation:

$$V = I_{EXT} R_T + N \quad (1)$$

Where $I_{EXT}$ is the excitation current, $R_T$ is the RTD resistance, and N represents additive noise. FIG. 2 illustrates the result 20 of such additive errors with respect to the RTD circuit 10 shown in FIG. 1. The noise N may cause lack of accuracy in the measurement. These errors can be of a systematic nature, such as those related to change in material properties for large temperatures; however these errors may also be of a random nature, such as those related to measurement noise, manufacturing, ambient conditions and others.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for an improvement method and system for RTD measurement It is another aspect of the disclosed embodiments to provide for enhanced RTD measurement accuracy by means of a variable excitation current.

The aforementioned aspects and other objectives can now be achieved as described herein. In an embodiment, a method for measuring a temperature, can involve: measuring a voltage with a resistance temperature detector using a variable excitation current, and deriving a process temperature from the voltage measured by the resistance temperature detector.

In an embodiment of the method, deriving the process temperature can further involve deriving the process temperature by accounting for random effects.

In an embodiment of the method, deriving the process temperature can further involve applying a plurality of values of the variable excitation current.

In an embodiment of the method, deriving the process temperature can further involve applying a different value of the variable excitation current at every iteration.

In an embodiment of the method, deriving the process temperature can further involve applying a plurality of values of the variable excitation current, measuring corresponding values of voltage, and estimating a resistance by applying a least square estimation.

In an embodiment of the method, deriving the process temperature can further involve applying a different value of the variable excitation current at every iteration, using a recursive least square estimation to measure a resistance, and thereafter using confidence intervals for instrument diagnostics.

In an embodiment of the method, deriving the process temperature can further involve deriving the process temperature by accounting for systematic temperature related effects on the measurement accuracy.

In another embodiment, an apparatus for measuring a temperature, can include a resistance temperature detector measuring a voltage, wherein the voltage can be measured with the resistance temperature detector using a variable excitation current; and wherein a process temperature can be derived from the voltage measured by the resistance temperature detector.

In an embodiment of the apparatus, the process temperature can be further derived by accounting for random effects.

In an embodiment of the apparatus, the process temperature can be further derived by applying a plurality of values of the variable excitation current.

In an embodiment of the apparatus, the process temperature can be further derived by applying a different value of the variable excitation current at every iteration.

In an embodiment of the apparatus, the process temperature can be further derived by applying a plurality of values of the variable excitation current, measuring corresponding values of voltage, and estimating a resistance by applying a least square estimation.

In an embodiment of the apparatus, the process temperature can be further derived by applying a different value of the variable excitation current at every iteration, using a recursive least square estimation to measure a resistance, and thereafter using confidence intervals for instrument diagnostics.

In an embodiment of the apparatus, the process temperature can be further derived by accounting for systematic temperature related effects on the measurement accuracy.

In another embodiment, a system for measuring a temperature, can include at least one processor; and a non-transitory computer-usable medium embodying computer program code, the computer-usable medium capable of communicating with the at least one processor. The computer program code can include instructions executable by the at least one processor and configured for: measuring a voltage with a resistance temperature detector using a variable excitation current, and deriving a process temperature from the voltage measured by the resistance temperature detector.

In an embodiment of the method, the instructions configured for deriving the process temperature can further include instructions configured for deriving the process temperature by accounting for random effects.

In an embodiment of the method, the instructions configured for deriving the process temperature can further include instructions configured for applying a plurality of values of the variable excitation current.

In an embodiment of the method, the instructions configured for deriving the process temperature can further include instructions configured for applying a different value of the variable excitation current at every iteration.

In an embodiment of the method, the instructions configured for deriving the process temperature can further include instructions configured for applying a plurality of values of the variable excitation current, measuring corresponding values of voltage, and estimating a resistance by applying a least square estimation.

In an embodiment of the method, the instructions configured for deriving the process temperature can further include instructions configured for applying a different value of the variable excitation current at every iteration, using a recursive least square estimation to measure a resistance, and thereafter using confidence intervals for instrument diagnostics.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
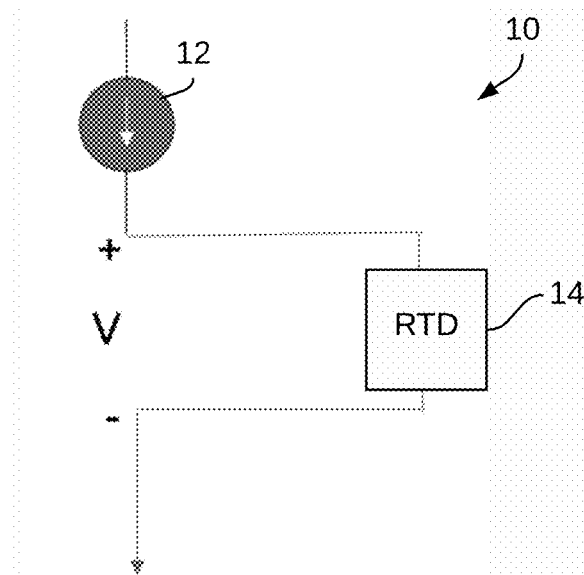
FIG. 1 illustrates a schematic diagram of a prior art RTD circuit that includes an RTD sensor with respect to a current source.
Figure 2:
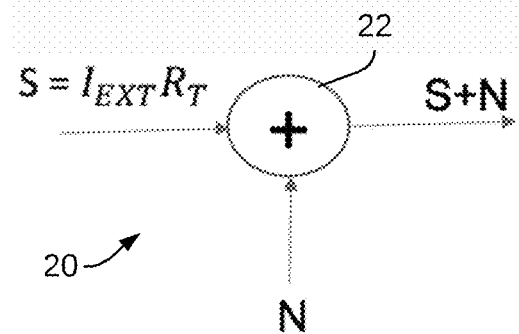
FIG. 2 illustrates the result of additive noise with respect to the RTD circuit shown in FIG. 1.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As discussed previously, RTD measurements can be based on ratio-metric voltage measurement, where a known current is passed through the RTD. Noise N may affect the RTD signal before an ADC (Analog-to-Digital Converter) samples the input, which in turn can cause error in the measurement. These errors can be of a systematic nature, such as those related to changes in material properties for large temperatures or may be of a random nature, related to measurement noise, manufacturing, ambient conditions and/or other factors.

The disclosed embodiments can be implemented to increase the accuracy of temperature measurement over a complete measurement range. Moreover, the disclosed approach can also provide bounds of uncertainty for a given instrument that can be used for instrument remote diagnostics. It can be appreciated that the disclosed embodiments can be implemented in the context of sensor devices having at least some embedded software that facilitates measuring, detecting and transmitting data (e.g., temperature, pressure, motion, etc).

As will be discussed in greater detail herein, the disclosed approach can provide benefits well beyond 20% in accuracy, and may be implemented in applications such as process measurement and control systems. Conventional approaches involve the use of fixed excitation currents (e.g., 100 uA). The disclosed approach, on the other hand, can deploy varying excitation current and algorithms implemented to increase accuracy.

In one embodiment, the excitation current can be changed on a continuous basis and, together with a Least Square Method, the estimate for Resistance R can be improved. In another embodiment, the excitation current level can be adapted to the temperature range so as to achieve a constant ratio of dV/dT.

Figure 3:
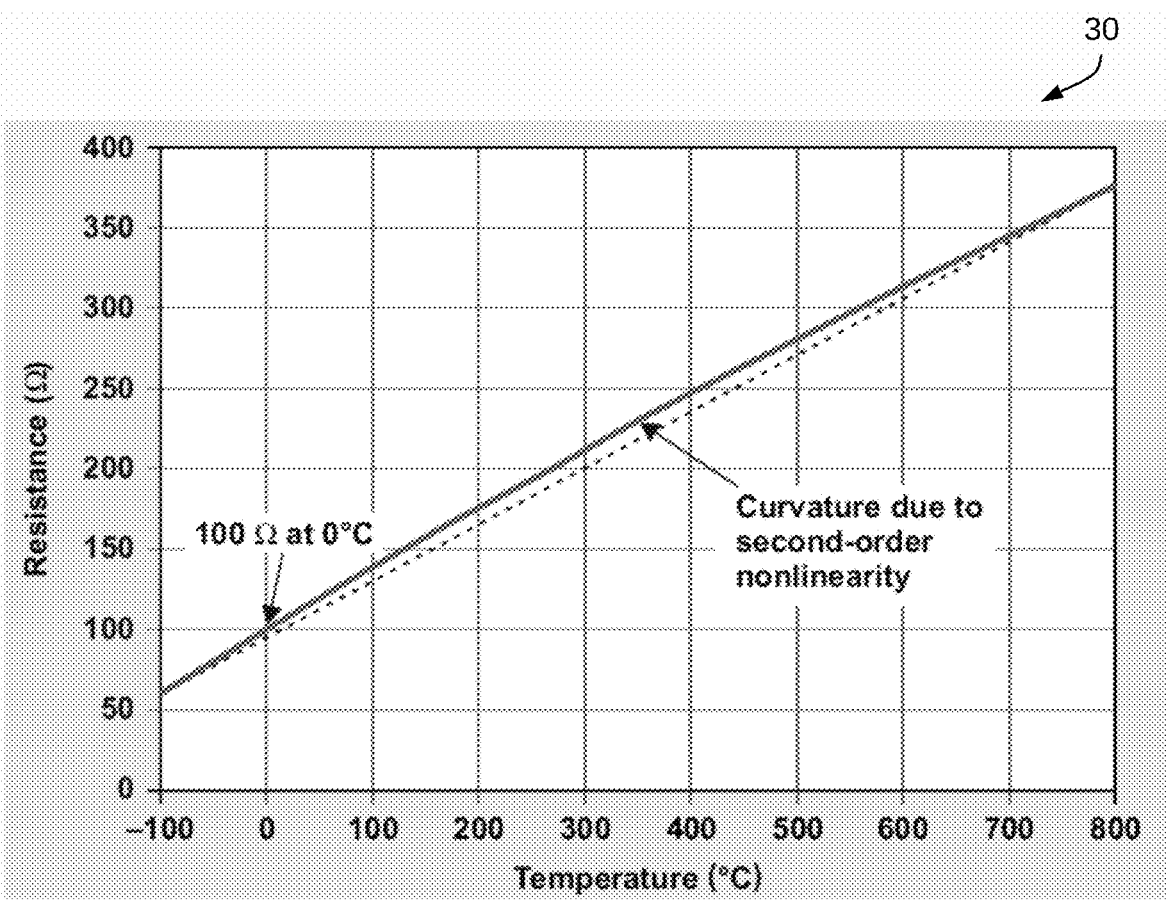
FIG. 3 illustrates a graph depicting data indicative of curvature due to second-order nonlinearity.
Figure 4:
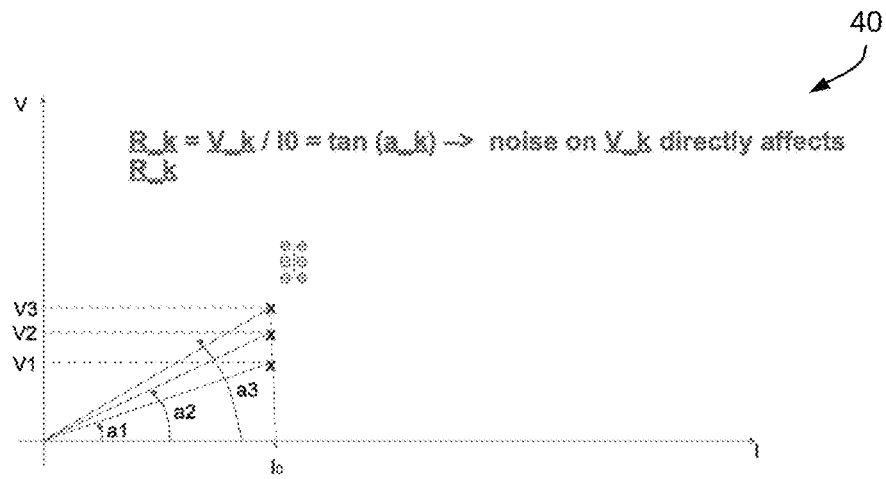
FIG. 4 illustrates a graph depicting how an estimate of resistance R may be noisy.

Referring now to FIG. 3, a graph 30 is shown depicting curvature due to second-order nonlinearity. A principle of operation of an RTD may involve establishing/obtaining dependency R=f(T) of the given material, and in real time, determining the material resistance R. The temperature T can be deduced from the function R=f(T). The resistance R can be determined by applying a current I, and then a voltage V is measured. Resistance is then determined by R=V/I. A problem with this approach, however, is that random errors in the estimation of R may convert directly into errors in the estimation of the temperature T. FIG. 4 illustrates a graph 40 depicting how an estimate of resistance R may be noisy. Thus, in a first embodiment, random effects should be eliminated.

Figure 5:
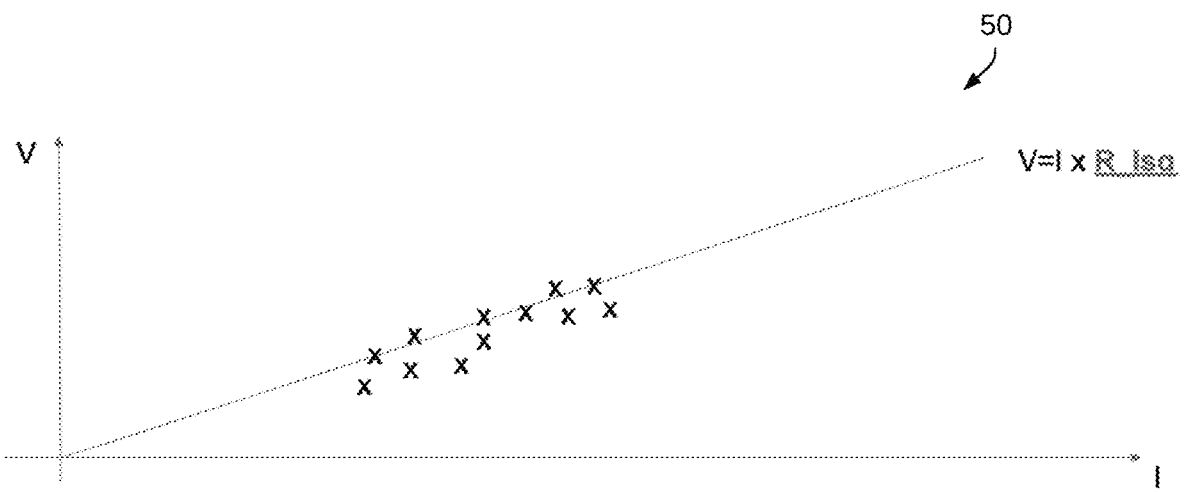
FIG. 5 illustrates a graph of voltage V versus current I implemented in batch form, in accordance with an embodiment.
Figure 6:
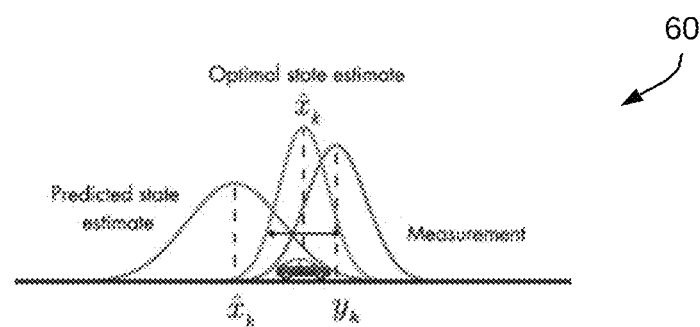
FIG. 6 illustrates a plot of estimates and a measurement, in accordance with an embodiment.
Figure 7:
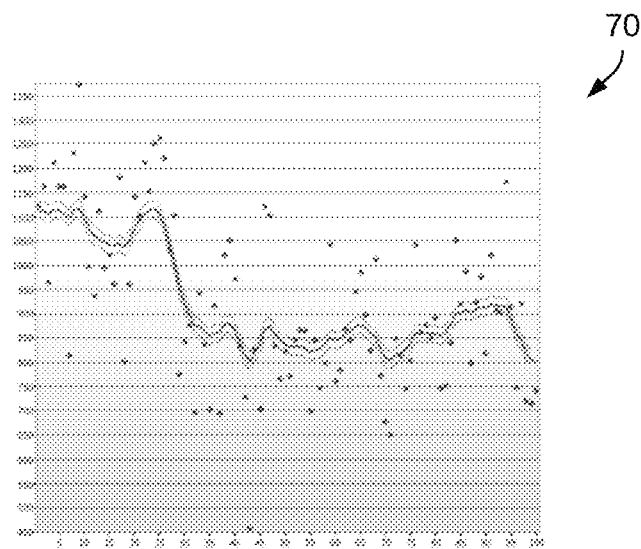
FIG. 7 illustrates a graph of measured data, in accordance with an embodiment.

FIG. 5 illustrates a graph 50 of voltage V versus current I implemented in batch form, in accordance with an embodiment. The following demonstrates this first embodiment:
1. Apply several values of current to the device: I_k, k=1:N
2. Measure corresponding values of voltage: V_k, k=1:N
3. Estimate R, by applying least square estimation with the model V=I×R+noise
   with batch data set given by (V_k, I_k), k=1:N FIG. 6 illustrates a plot 60 of estimates and a measurement, in accordance with an embodiment. FIG. 7 illustrates a graph 70 of measured data, in accordance with an embodiment. FIGS. 6-7 illustrate an alternative implementation in recursive form. The plot 60 shown in FIG. 6 depicts a curve 62 indicative of a predicted state estimate, a curve 64 indicative of an optimal state method, and a curve 66 indicative of a measurement.

This alternative approach can involve: 1) applying a different value of current I at every iteration and use a version of recursive LSQ, for example Kalman Filter, to estimate R; 2) this implies maintaining a few numbers in memory (basically, current estimate and covariance); and 3) the confidence intervals herewith created can be used by a cloud service to provide instrument diagnostics and other services.

Figure 8:
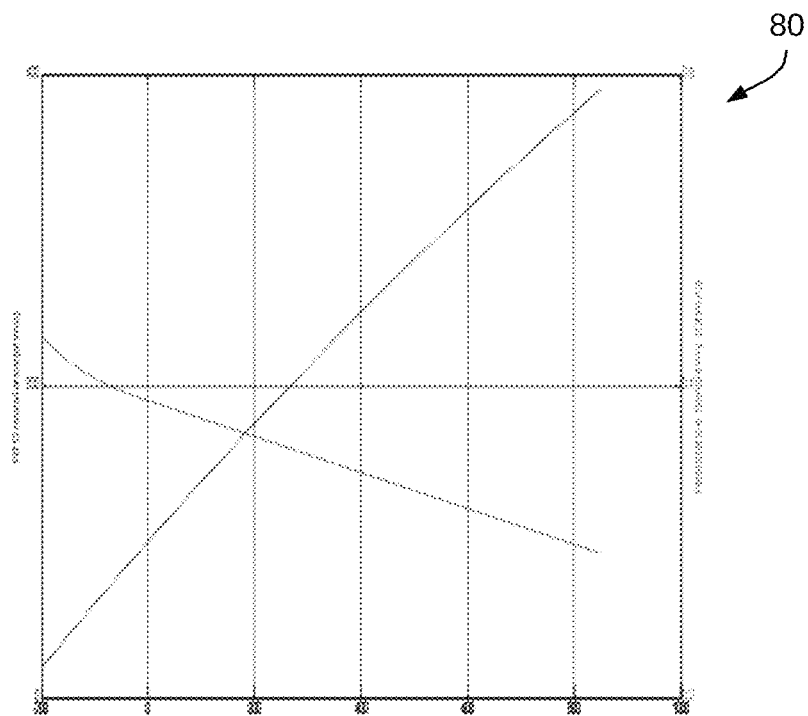
FIG. 8 illustrates a graph depicting data indicative of RTD resistance (ohms) and resistance sensitivity (Ohm/C)
Figure 9:
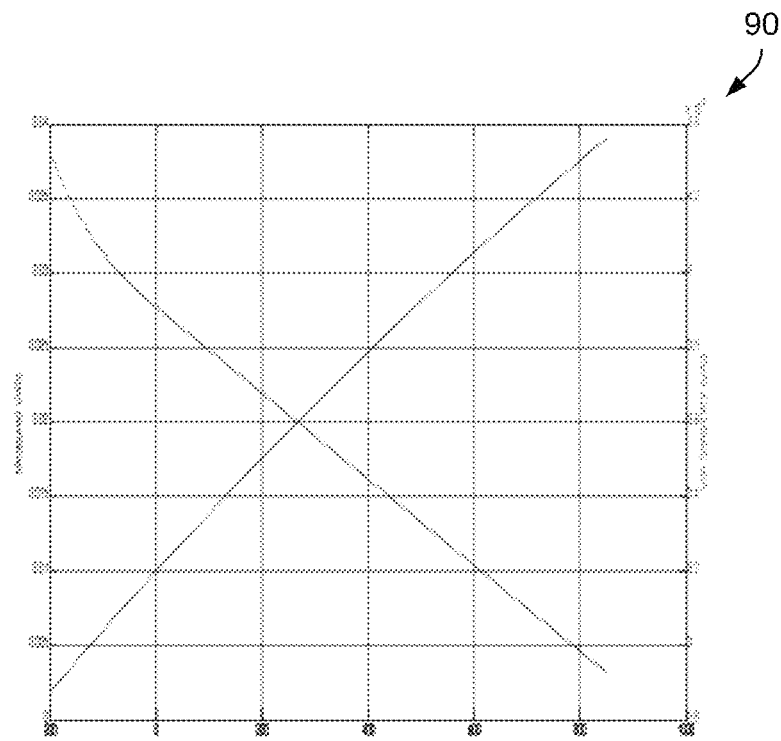
FIG. 9 illustrates a graph depicting data indicative of measured volts and volt sensitivity (V/C)

Note that for speed and low memory consumption, a real time implementation can use "recursive LSQ", with the current applied changing following any suitable pattern (e.g. randomly). The benefits of this first embodiment include an optimal estimation of R, and thus better estimation of T: cancelling random effects, and the fact that confidence intervals for R and thus for T can be generated. In addition, this information may be important for control applications, which may impact sensor remote diagnostics. Additionally, simulations suggest an accuracy improvement by a factor of 2 to 5. This approach can be generalized to other devices where excitation current is used A second embodiment can involve eliminating systematic temperature related errors. Note that for a fixed excitation current, RTD's may possess a variable sensitivity with respect to process temperature. FIG. 8 illustrates a graph 80 depicting data indicative of RTD resistance (ohms) and resistance sensitivity (Ohm/C), and FIG. 9 illustrates a graph depicting data indicative of measured volts and volt sensitivity (V/C). RTD resistance sensitivity (dR/dT) may be represented as a monotonically decreasing curve, such as shown in graph 80 of FIG. 8 and graph 90 of FIG. 9. An equivalent voltage sensitivity (dV/dT) may also be a monotonically decreasing function. The RTD resistance measurement error at higher process temperatures (e.g., around 850° C.) may lead to higher measurement errors in comparison to lower process temperature (e.g., −200° C.) measurement error.

The process temperature can be derived from the measured voltage V as shown in equation (2) below:

$$T = f(V) = f(IR_T + N) \quad (2)$$

The noise component N may have a high impact on the accuracy for high process temperature measurements due to lower dV/dT.

A second embodiment can involve the use of an adaptive excitation current. That is, a constant voltage sensitivity (dV/dT) can be implemented across the RTD temperature range by excitation current adaptation. This approach can involve adapting the excitation current such that the slope of voltage versus temperature remains constant (dV/dT=constant). The voltage sensitivity $\Delta V/\Delta T$ can be predefined as a constant value and the excitation current can be adapted as per the formula below:

$$\frac{\Delta V}{\Delta T} = \alpha$$

$$\Delta V = \alpha \Delta T$$

If the excitation current is I for RTD resistance R, and if the RTD resistance changes to $R_N$, the excitation current adapts to $I_N$. Assuming the voltage change is $\delta V$, then:

$$\delta V = I_N R_N - IR$$

$$\delta I = (\delta V + IR)/R_N - I$$

$$\delta I = (\alpha \delta T + IR)/R_N - I$$

Figure 10:
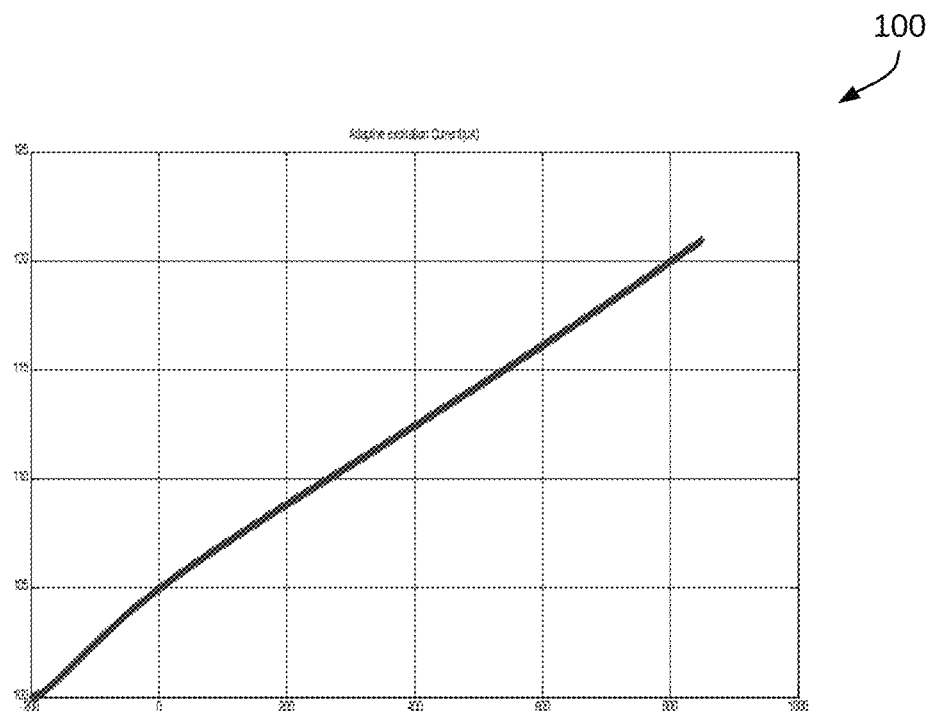
FIG. 10 illustrates a graph indicative of an adaptive excitation current ($\mu A$), in accordance with an embodiment.
Figure 11:
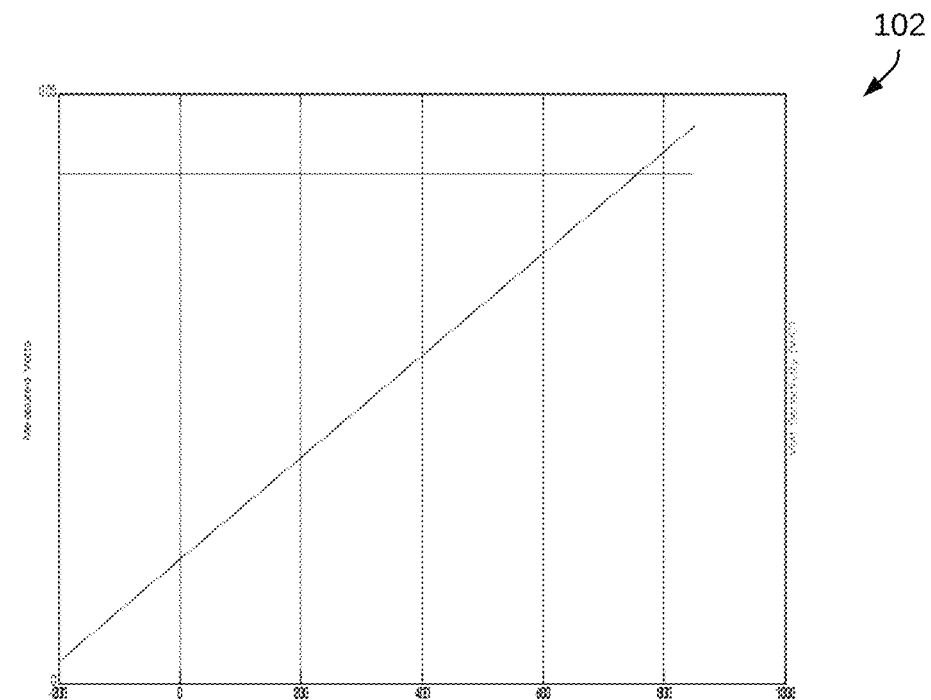
FIG. 11 illustrates a graph of measured volts and voltage sensitivity (V/C), in accordance with an embodiment.

With this we can pre-compute the excitation current value for different RTD resistance values, which can be stored as a table in the firmware. With this adaptive current source, voltage sensitivity with respect to temperature can be a constant value. The measurement accuracy at higher process temperatures in the presence of noise can be enhanced. Thus, the step or operation of deriving the process temperature can involve deriving the process temperature by accounting for systematic temperature related effects. This step or operation can involve the use of the aforementioned adaptive excitation current such that a constant a constant voltage sensitivity (dV/dT) can be implemented across the RTD temperature range by excitation current adaptation. This approach can also involve adapting the excitation current such that the slope of voltage versus temperature remains constant (dV/dT=constant) as discussed herein. FIG. 10 illustrates a graph 100 indicative of an adaptive excitation current (μA), in accordance with an embodiment. FIG. 11 illustrates a graph 102 of measured volts and voltage sensitivity (V/C), in accordance with an embodiment.

Figure 12:
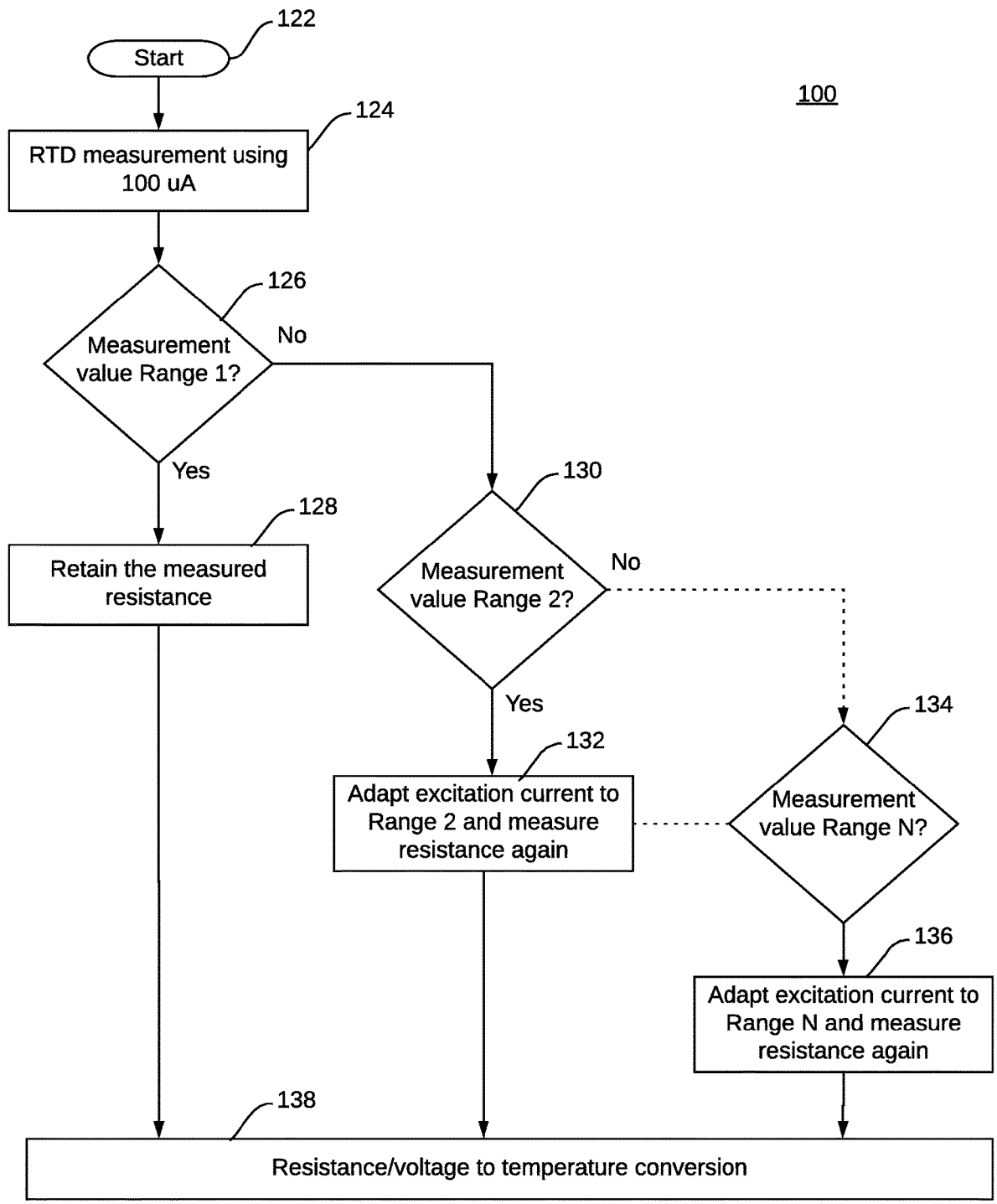
FIG. 12 illustrates a flow chart of operations depicting logical operational steps of a method for enhanced RTD measurement, in accordance with an embodiment.

FIG. 12 illustrates a flow chart of operations depicting logical operational steps of a method 120 for enhanced RTD measurement, in accordance with an embodiment. As shown at block 122, the process starts. Next, as depicted at block 124, a step or operation can be implemented for RTD measurement using, for example, 100 μA. Thereafter, as shown at decision block 126, a step or operation can be implemented to determine whether or not to take a measurement value over a first range. If yes, then a step or operation can be implemented as shown at block 128, to retain the measured resistance. If yes, then as shown at decision block 130, a step or operation can be implemented to determine whether or not to take a measurement over a second range. If not, then, as shown at block 132, a step or operation can be implemented to adapt the excitation current to the second range and measure resistance again.

In response to the operation depicted at block 130, a similar process can be implemented with respect to an N range, as shown at decision block 134. Thereafter, as depicted at block 136, a step or operation can be implemented to adapt the excitation current to range N and measure resistance again. Note that following the operations depicted at block 128, block 132, and block 136, a step or operation can be implemented, as shown at block 138, involving resistance/voltage to temperature conversion. Note that the pre-computed excitation current vs. RTD resistance table can be stored in the device. For complexity reduction, the excitation current can be stored in intervals of 10 μA (i.e. excitation current of 100 μA, 110 μA, 120 μA).

Figure 13:
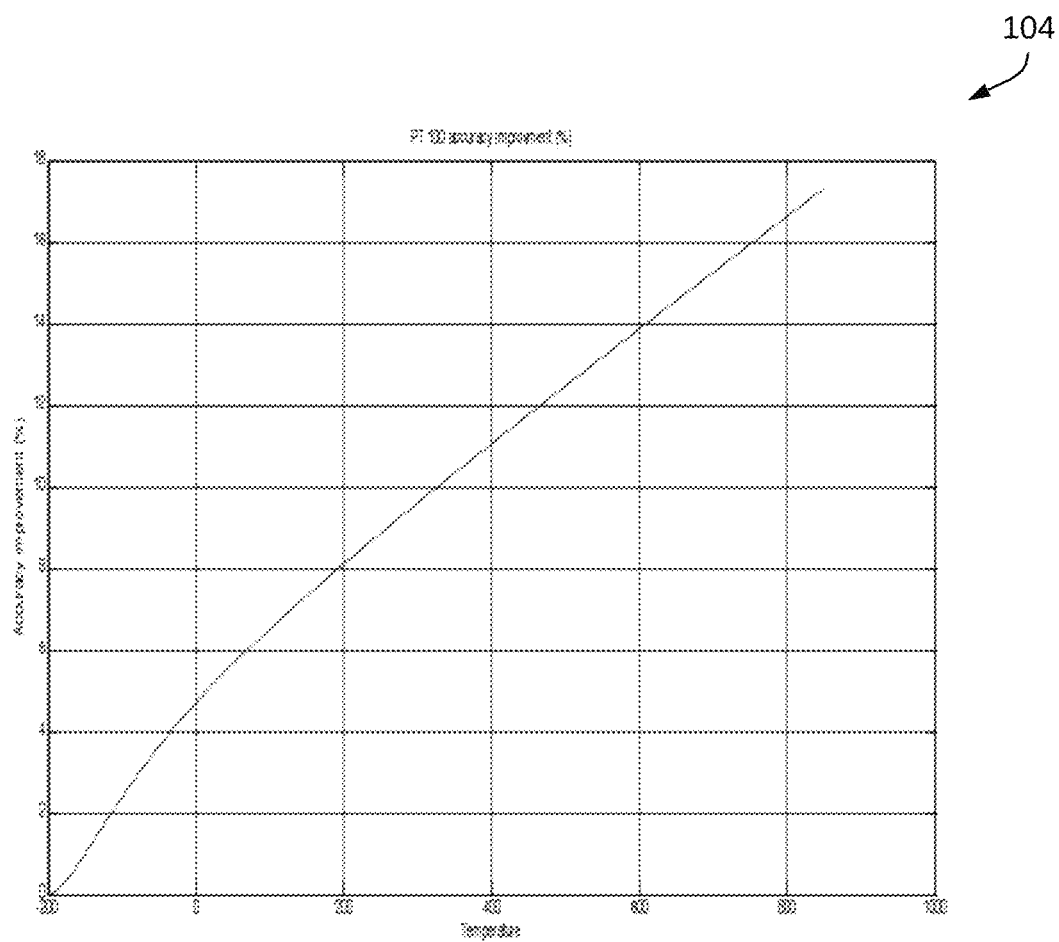
FIG. 13 illustrates a graph depicting data indicative of accuracy improvement (%) with respect to temperature, in accordance with an embodiment.

FIG. 13 illustrates a graph 104 depicting data indicative of accuracy improvement (%) versus accuracy improvement using the adaptive current control technique disclosed herein, in accordance with an embodiment. Note that a typical calculation for PT100 at 850 C (390 ohm) can result in an accuracy improvement of 17%. Every 29 mohm of resistance measurement error can lead to 0.1 C temperature error. With a fixed current of 100 uA, a voltage output=100 uA*390 ohm=39 mV. In addition, an error 2.9 uV (29 mohm*100 uA) can give rise to 0.1 C error in temperature. With an adaptive current of approximately 120 uA (e.g., see the adaptive excitation current graph 104 in FIG. 13), the voltage output=120 uA*390 ohm=46.8 mV. An error of 3.48 uV (29 mohm*120 uA) can give rise to 0.1 C error in temperature. Thus, a voltage signal benefit for 0.1 C accuracy=3.48-2.9=0.58 uV, and an accuracy Improvement=0.58/3.48*0.1=0.017 C=17% of 0.1 C. It should be appreciated that the data shown in graph 104 and the other graphs discussed herein should not be considered limiting features of the embodiments. That is, such graphs and the data contained therein are provided herein for illustrative and exemplary purposes only.

The disclosed embodiments are described at least in part herein with reference to flowchart or flow diagram illustrations, steps and/or block diagrams of methods, systems, devices and computer program products and data structures and scripts. For example, FIG. 12 illustrates blocks depicting various steps, operations, or instructions. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which can execute via the processor of the computer or other programmable data processing apparatus, and may create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of features for RTD measurement, for example, may be considered a special-purpose computer designed with a purpose of enabling RTD measurements such as discussed herein. In general, however, embodiments may be implemented as a method, and/or a computer program product at any possible technical detail level of integration. The computer program product may include a computer readable storage medium (or media) having computer readable program instructions thereon for causing a processor to carry out aspects of the embodiments, such as the steps, operations or instructions described herein.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks herein.

The flow charts and block diagrams in the figures herein can illustrate the architecture, the functionality, and the operation of possible implementations of systems, methods, and computer program products according to various embodiments (e.g., preferred or alternative embodiments). In this regard, each block in the flow chart or block diagrams may represent a module, a segment, or a portion of instructions, which comprises one or more executable instructions for implementing the specified logical function(s).

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

Figure 14:
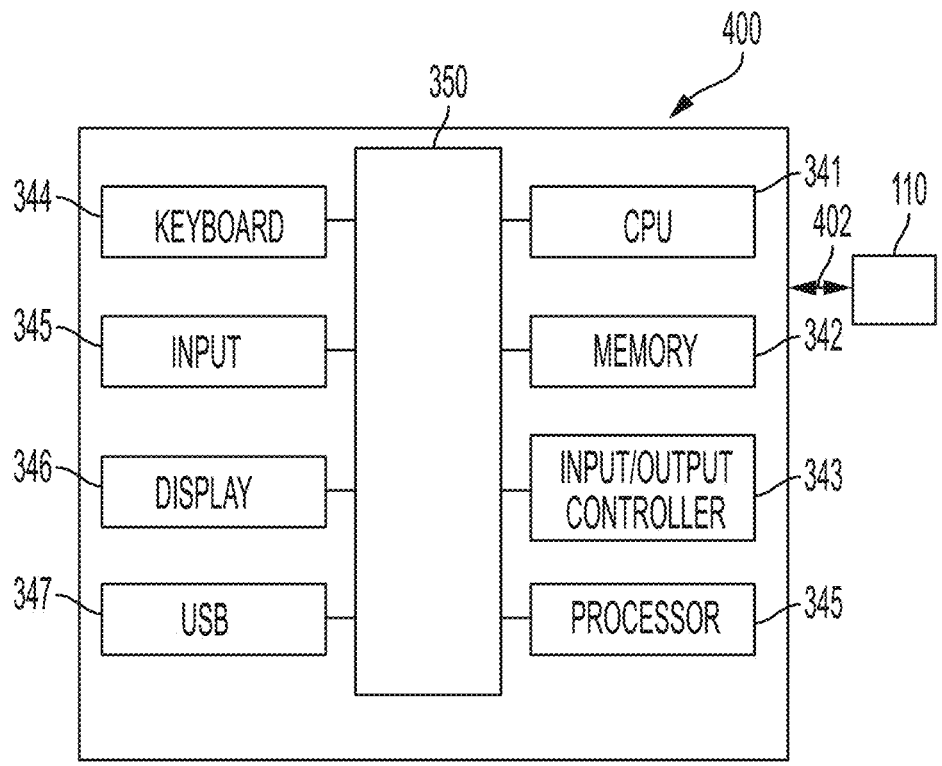
FIG. 14 illustrates a schematic view of a computer system, in accordance with an embodiment.
Figure 15:
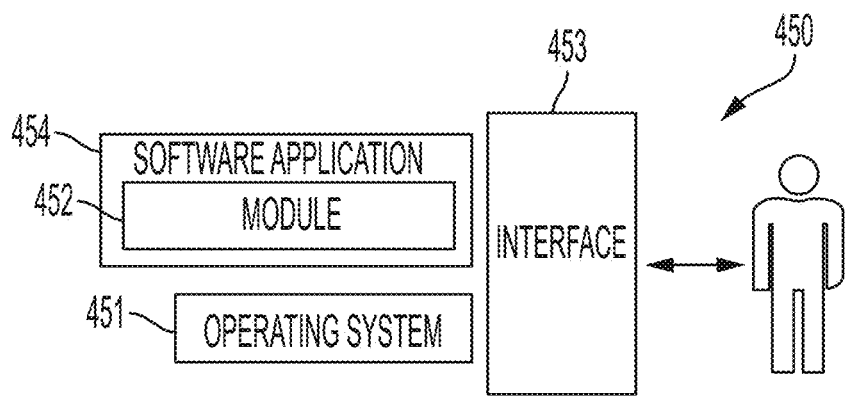
FIG. 15 illustrates a schematic view of a software system including a module, an operating system, and a user interface, in accordance with an embodiment.

FIG. 14 and FIG. 15 are shown only as exemplary diagrams of data-processing environments in which example embodiments may be implemented. It should be appreciated that FIG. 14 and FIG. 15 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 14, some embodiments may be implemented in the context of a data-processing system 400 that can include, for example, one or more processors such as a processor 345 (e.g., a microprocessor and/or additional processing devices), a CPU (Central Processing Unit) 341, a memory 342 (e.g. memory such as ROM/RAM (i.e. ROM and/or RAM)), a controller 343 (e.g., an input/output controller), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components 110 and communications 402 between these other peripheral connections and components 110.

The system bus 350 can serve as the main electronic information highway interconnecting the other illustrated components of the hardware of data-processing system 400. In some embodiments, the processor 341 may be a CPU that functions as the central processing unit of the data-processing system 400, performing calculations and logic operations required to execute a program. Read only memory (ROM) and random access memory (RAM) of the ROM/RAM are examples of non-transitory computer-readable storage media.

The controller 343 can interface with one or more optional non-transitory computer-readable storage media to the system bus 350. These storage media may include, for example, an external or internal DVD drive, a CD ROM drive, a hard drive, flash memory, a USB drive or the like. These various drives and controllers can be optional devices.

Program instructions, software or interactive modules for providing an interface and performing any querying or analysis associated with one or more data sets may be stored in, for example, ROM and/or RAM. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of data-processing system 400 can communicate electronically through the system bus 340 or similar architecture. The system bus 350 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 15 illustrates a computer software system 450 for directing the operation of the data-processing system 400 depicted in FIG. 14. The software application 454, may be stored for example in memory 342 shown in FIG. 14 and/or another memory and can include one or more modules such as the module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400.

The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the steps, instructions, operations and scripts such as those discussed herein (e.g., such as the steps operations depicted and discussed herein with respect to FIG. 12).

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a data-processing system such as, for example, the data-processing system 400 shown in FIG. 14.

The disclosed embodiments can constitute an improvement to a computer system (e.g., such as the data-processing system 400 shown in FIG. 14) rather than simply the use of the computer system as a tool. The disclosed modules, instructions, steps and functionalities discussed herein can result in a specific improvement over prior systems, resulting in improved data-processing systems.

FIG. 14 and FIG. 15 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. The disclosed embodiments require less time for processing and also fewer resources in terms of memory and processing power in the underlying computer technology. Such improvements can result from implementations of the disclosed embodiments. The claimed solution may be rooted in computer technology in order to overcome a problem specifically arising in the realm of computers and computer networks.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for measuring a temperature using a resistance temperature detector (RTD), comprising:
measuring a voltage with the resistance temperature detector using a plurality of values of a variable excitation current; and
deriving a process temperature from the voltage measured by the resistance temperature detector, wherein deriving the process temperature further comprises:
applying, to the RTD, the plurality of values of the variable excitation current;
measuring corresponding values of voltage across the RTD; and
estimating a resistance of the RTD by applying a least square estimation to the plurality of values of the variable excitation current and the measured corresponding values of voltage.

2. The method of claim 1 wherein deriving the process temperature further comprises deriving the process temperature by accounting for random effects.

3. The method of claim 2 wherein deriving the process temperature further comprises applying a different value of the variable excitation current.

4. The method of claim 2 wherein deriving the process temperature further comprises:
applying a different value of the variable excitation current;
using a recursive least square estimation to measure a resistance; and
thereafter using confidence intervals for instrument diagnostics.

5. The method of claim 1 wherein deriving the process temperature further comprises deriving the process temperature by accounting for systematic temperature related effects on a measurement accuracy.

6. An apparatus for measuring a temperature, comprising:
a resistance temperature detector (RTD) measuring a voltage,
wherein the voltage is measured with the resistance temperature detector using a plurality of values of a variable excitation current; and
wherein a process temperature is derived from the voltage measured by the resistance temperature detector comprising:
applying, to the RTD, the plurality of values of the variable excitation current;
measuring corresponding values of voltage across the RTD; and
estimating a resistance of the RTD by applying a least square estimation to the plurality of values of the variable excitation current and the measured corresponding values of voltage.

7. The apparatus of claim 6 wherein the process temperature is further derived by accounting for random effects.

8. The apparatus of claim 7 wherein the process temperature is further derived by applying a different value of the variable excitation current.

9. The apparatus of claim 7 wherein the process temperature is further derived by:
applying a different value of the variable excitation current;
using a recursive least square estimation to measure a resistance; and
thereafter using confidence intervals for instrument diagnostics.

10. The apparatus of claim 6 wherein the process temperature is further derived by accounting for systematic temperature related effects.

11. A system for measuring a temperature using a resistance temperature detector (RTD), comprising:
at least one processor; and
a non-transitory computer-usable medium embodying computer program code, the computer-usable medium capable of communicating with the at least one processor, the computer program code comprising instructions executable by the at least one processor and configured for:
measuring a voltage with a resistance temperature detector using a plurality of values of a variable excitation current; and
deriving a process temperature from the voltage measured by the resistance temperature detector, wherein the instructions configured for deriving the process temperature further comprises instructions configured for:
applying, to the RTD, the plurality of values of the variable excitation current;
measuring corresponding values of voltage across the RTD; and
estimating a resistance of the RTD by applying a least square estimation to the plurality of values of the variable excitation current and the measured corresponding values of voltage.

12. The system of claim 11 wherein the instructions configured for deriving the process temperature further comprises instructions configured for deriving the process temperature by accounting for random effects.

13. The system of claim 12 wherein the instructions configured for deriving the process temperature further comprises instructions configured for applying a different value of the variable excitation current.

14. The system of claim 12 wherein the instructions configured for deriving the process temperature further comprises instructions configured for:
applying a different value of the variable excitation current;
using a recursive least square estimation to measure a resistance; and
thereafter using confidence intervals for instrument diagnostics.

* * * * *